(12) United States Patent
Sato

(10) Patent No.: US 8,587,839 B2
(45) Date of Patent: Nov. 19, 2013

(54) IMAGE TRANSMISSION SYSTEM

(75) Inventor: Katsuhiro Sato, Kani (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 840 days.

(21) Appl. No.: 12/730,983

(22) Filed: Mar. 24, 2010

(65) Prior Publication Data
US 2010/0245931 A1     Sep. 30, 2010

(30) Foreign Application Priority Data

Mar. 31, 2009     (JP) ................................ 2009-085992

(51) Int. Cl.
*H04N 1/00*     (2006.01)
(52) U.S. Cl.
USPC ........... 358/407; 358/442; 358/404; 358/468; 455/420; 455/557
(58) Field of Classification Search
USPC ............... 358/407, 434, 437, 442, 1.13, 1.15, 358/1.16, 400, 404, 468; 370/216, 338; 455/41.2, 420, 517, 552.1, 554.2, 455/556.2, 557
See application file for complete search history.

(56) References Cited

U.S. PATENT DOCUMENTS

| | | | |
|---|---|---|---|
| 5,737,325 A | 4/1998 | Fukuda | |
| 2003/0058832 A1 | 3/2003 | Knauerhase et al. | |
| 2004/0063458 A1* | 4/2004 | Hori et al. | 455/554.2 |
| 2004/0243840 A1* | 12/2004 | Tran | 713/201 |
| 2005/0148326 A1* | 7/2005 | Nogawa et al. | 455/420 |
| 2006/0034228 A1 | 2/2006 | Kim et al. | |
| 2006/0073847 A1* | 4/2006 | Pirzada et al. | 455/556.2 |
| 2006/0104200 A1* | 5/2006 | Park | 370/216 |
| 2006/0246941 A1* | 11/2006 | Watanabe et al. | 455/552.1 |
| 2007/0140191 A1* | 6/2007 | Kojima | 370/338 |
| 2008/0261640 A1* | 10/2008 | Yoshida | 455/517 |
| 2009/0005115 A1* | 1/2009 | Chan et al. | 455/557 |
| 2009/0239468 A1* | 9/2009 | He et al. | 455/41.2 |

FOREIGN PATENT DOCUMENTS

| | | |
|---|---|---|
| CN | 1725901 A | 1/2006 |
| JP | H08-163636 A | 6/1996 |
| JP | 2000-040995 A | 2/2000 |
| JP | 2000-197087 A | 7/2000 |

(Continued)

OTHER PUBLICATIONS

The State Intellectual Property Office of the People's Republic of China, Notification of First Office Action for Chinese Patent Application No. 201010144749.5 (counterpart to above-captioned patent application), issued Oct. 17, 2011.

(Continued)

*Primary Examiner* — Kimberly A Williams
(74) *Attorney, Agent, or Firm* — Baker Botts L.L.P.

(57) ABSTRACT

An image transmission system including an image processing device and a communicating device which are communicable with each other through an access point in an infrastructure mode through an "m" channel, wherein upon a communication failure in the infrastructure mode, the communication mode is switched from the infrastructure mode to an ad hoc mode in which the two devices are directly communicable with each other through an "n" channel. During the communication in the ad hoc mode, the "m" channel is scanned to detect the access point at a predetermined time interval, and upon detection of the access point through the "m" channel, the communication mode is switched back to the infrastructure mode.

12 Claims, 7 Drawing Sheets

(56) References Cited

FOREIGN PATENT DOCUMENTS

| JP | 2004-128785 A | 4/2004 |
| JP | 2004-229237 A | 8/2004 |
| JP | 2004-242187 A | 8/2004 |
| JP | 2005-236696 A | 9/2005 |
| JP | 2007-088727 A | 4/2007 |
| JP | 2008-182439 A | 8/2008 |
| JP | 2008-288727 A | 11/2008 |

OTHER PUBLICATIONS

Japan Patent Office, Notification of Reason for Refusal for Japanese Patent Application No. 2009-085992 (counterpart to above-captioned patent application), mailed Dec. 21, 2010.

* cited by examiner

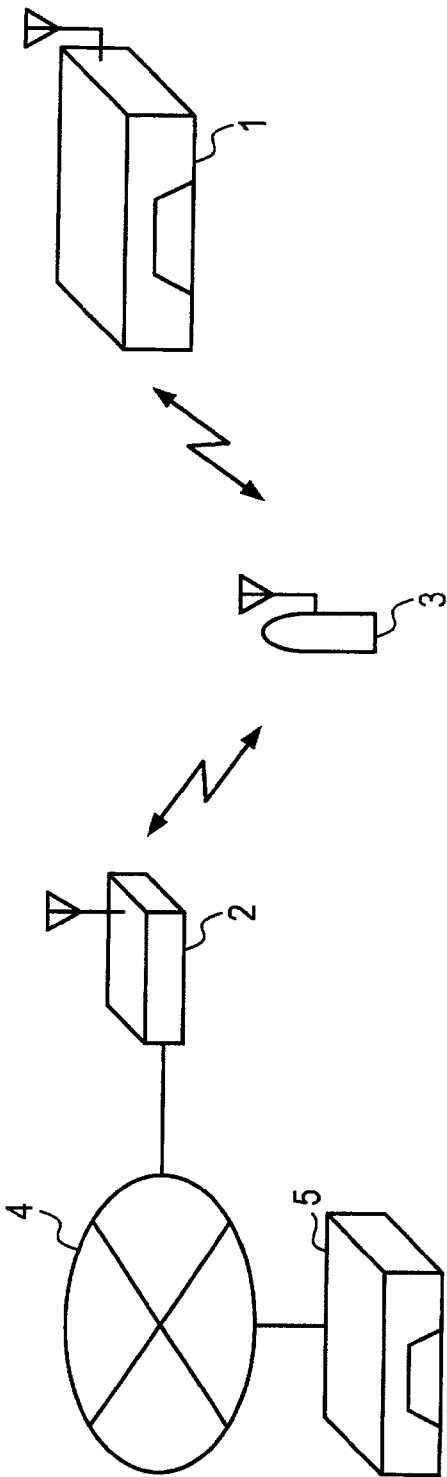
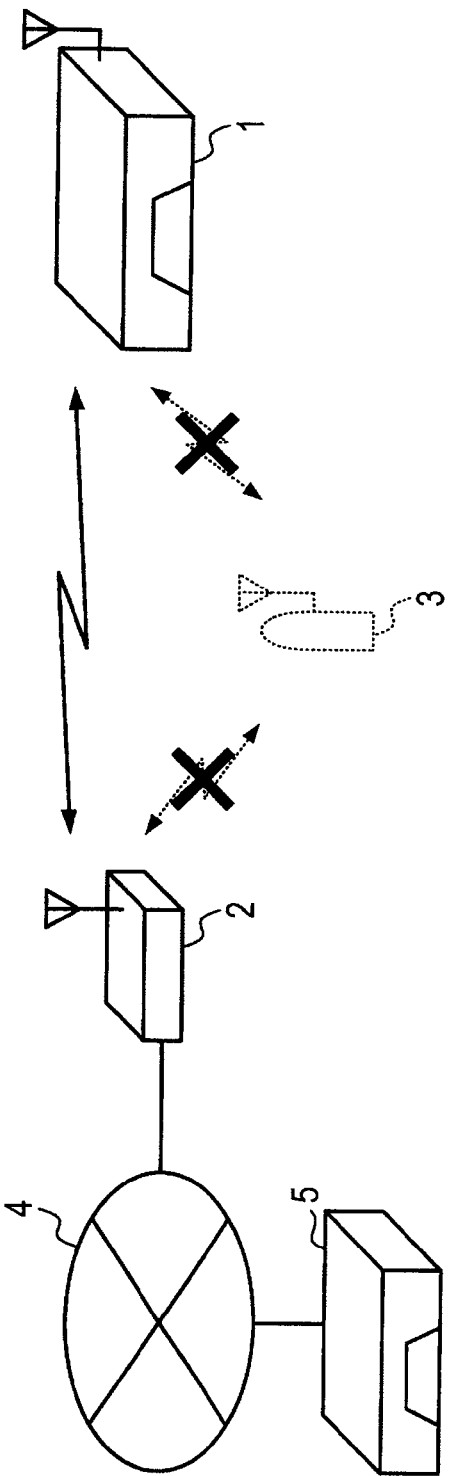

IMAGE TRANSMISSION SYSTEM

CROSS REFERENCE TO RELATED APPLICATION

The present application claims the priority from Japanese Patent Application No. 2009-085992 filed Mar. 31, 2009, the disclosure of which is herein incorporated by reference in its entirety.

BACKGROUND OF THE INVENTION

1. Field of the Invention

The present invention relates to an image transmission system capable of transmitting and receiving an image through a facsimile communication function.

2. Description of Related Art

There is known a wireless network system including a plurality of wireless communication peripherals capable of wireless communication with each other through an access point in a communication mode called an "infrastructure mode". Also known is a wireless network system wherein a plurality of wireless communication peripherals are capable of direct wireless communication with each other in a communication mode called an "ad hoc mode".

There is also proposed a technique for switching the wireless network system between the above-indicated infrastructure mode and ad hoc mode. In this wireless network system, wireless connection between a PC (personal computer) and a printer is made in the ad hoc mode prior to wireless connection therebetween in the infrastructure mode, and wireless communication parameters used in the infrastructure mode are transmitted from the PC to the printer.

If the PC and the printer are not communicable with each other through the access point after the wireless connection between the PC and printer is made in the infrastructure mode, the PC and printer are switched back to the hoc mode, and error information is transmitted from the printer to the PC.

In a known MFP (multifunction peripheral) or facsimile device, a communicating portion for communication with other facsimile devices and an image input and output portion for reading, printing and displaying an image are generally incorporated in a single housing.

In an image transmission system wherein two devices corresponding to the above-indicated communicating portion and image input and output portion are accommodated in respective two separate housings and communicate with each other in a wireless fashion, on the other hand, interruption of the wireless connection between the two devices results in a failure of transmission of image data therebetween. In this respect, it is extremely important to maintain the wireless communication between the two devices.

The technique described above permits transmission of the error information from one of the two devices to the other by switching the wireless network system back to the ad hoc mode if the two devices are not communicable in the infrastructure mode.

However, the technique described above is limited to the technique for transmitting the error information in the event of failure of the wireless communication in the infrastructure mode, and does not disclose to details of a technique that permits the wireless communication between the two devices after the transmission of the error information.

In the above-indicated technique, the PC refers to communication parameters set by the user when the communication mode is switched back to the ad hoc mode. If the wireless communication parameters for the ad hoc mode are inadequately changed for some reason or other (by an erroneous operation by the user, for example) after the wireless connection in the infrastructure mode is made, there is a risk of a failure to establish the wireless connection by switching the communication mode from the infrastructure mode back to the ad hoc mode.

SUMMARY OF THE INVENTION

The present invention was made to solve the problem described above. It is therefore an object of this invention to provide an image transmission system configured to transmit an image by wireless communication and capable of maintaining the wireless communication by switching the communication mode from the infrastructure mode to the ad hoc mode if the wireless connection is not possible in the infrastructure mode.

The object indicated above can be achieved according to the principle of the present invention, which provides an image transmission system comprising:

an image processing device having an image input portion configured to input an image, an image output portion configured to output an image, and a first wireless LAN communication portion configured to effect wireless communication through its wireless LAN function; and a communicating device having an image transmission/reception portion configured to transmit and receive an image to and from an external device through a facsimile communication function, and a second wireless LAN communication portion configured to effect wireless communication through its wireless LAN function, wherein the image input through the image input portion is transmitted from the first wireless LAN communication portion of the image processing device to the communicating device and is then transmitted from the image transmission/reception portion to the external device, and wherein an image transmitted from the external device is received by the image transmission/reception portion of the communicating device, transmitted from the second wireless LAN communication portion to the image processing device, and output by the image output portion, each of the image processing device and the communicating device including:

a first communication-setting-information memory portion for storing first communication setting information which is set by a user of the image transmission system and which is necessary for establishing first wireless connection between the image processing device and communicating device through the wireless LAN function in an infrastructure mode in which the image processing device and communicating device are communicable with each other through an access point;

a second communication-setting-information memory portion for storing second communication setting information which has been set without an operation by the user and cannot be changed by the user and which is necessary to establish second wireless connection between the image processing device and communicating device through the wireless LAN function in an ad hoc mode in which the image processing device and communicating device are communicable directly with each other;

a first wireless connecting portion configured to establish the first wireless connection in the infrastructure mode on the basis of the first communication setting information;

a second wireless connecting portion configured to establish the second wireless connection in the ad hoc mode on the basis of the second communication setting information; and a communication control portion configured to command the first wireless connecting portion to try to establish the first wireless connection, to place the image processing device and communicating device in a state for wireless communication in the infrastructure mode after the first wireless connection is established, to command the second wireless connecting portion to try to establish the second wireless connection if the first wireless connection cannot be maintained, and to switch a communication mode of the image transmission system from the infrastructure mode to the ad hoc mode after the second wireless connection is established.

BRIEF DESCRIPTION OF THE DRAWINGS

The above and other objects, features, advantages and technical and industrial significance of the present invention will be better understood by reading the following detailed description of a preferred embodiment of the present invention, when considered in connection with the accompanying drawings, in which:

FIGS. 1A and 1B are views showing an overall arrangement of a communication network including an image transmission system constructed according to one embodiment of this invention and external devices outside the image transmission system;

DETAILED DESCRIPTION OF THE PREFERRED EMBODIMENT

The preferred embodiment of this invention will be described in detail, by reference to the accompanying drawings.

<Overall Arrangement of Image Transmission System.

Referring first to FIGS. 1A and 1B, there will be described an overall arrangement of a communication network including an image transmission system and external devices outside the image transmission system. The image transmission system is constructed according to one embodiment of the present invention The image transmission system of the present embodiment is a system capable of implementing transmission and reception of an image through a facsimile communication function, and includes an image processing device 1 and a communicating device 2 as shown in FIGS. 1A and 1B. The image transmission system further includes an access point 3 through which the image processing device 1 and the communicating device 2 are communicable with each other in an infrastructure mode, as indicated in FIG. 1A. The image processing device 1 and the communicating device 2 are also communicable in an ad hoc mode, directly with each other, without using the access point 3, as indicated in FIG. 1B. The communicating device 2 is connected to a PSTN (public switched telephone networks) 4, and is communicable through the PSTN 4 with external devices such as a facsimile device 5, which are provided outside the image transmission system 1-3.

Figure 2A:
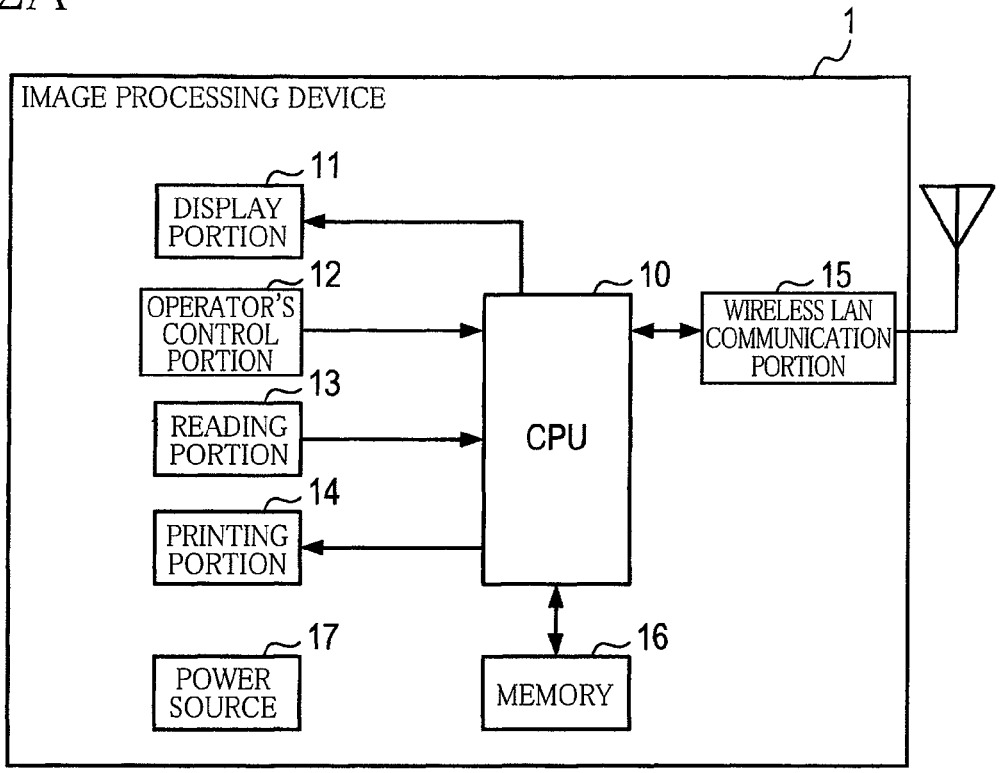
FIGS. 2A and 2B are block diagrams respectively showing arrangements of an image processing device and a communicating device of the image transmission system of FIGS. 1A and 1B.

As shown in FIG. 2A, the image processing device 1 includes a CPU 10, a display portion 11, an operator's control portion 12, a reading portion 13, a printing portion 14, a wireless LAN communication portion 15, a memory 16 and a power source 17. The CPU 10, display portion 11, operator's control portion 12, reading portion 13, printing portion 14, memory 16 and power source 17 are substantially identical in construction with those provided in an MFP (multifunction peripheral) commonly known in the art.

Namely, the CPU 10 is a control portion configured to control the other portions of the image processing device 1, according to control programs stored in the memory 16. The display portion 11 is an output portion including a suitable display device such as a liquid crystal display (LCD) configured to display or indicate various kinds of information. For instance, the display portion 11 is also used to display an image (hereinafter referred to as "facsimile reception image") received through a facsimile communication function via the communicating device 2, when the facsimile reception image is not printed by the printing portion 14. The operator's control portion 12 is an input portion having key switches or a touch panel and configured to enable the user of the image transmission system to input various signals for the image processing device 1 to perform various functions.

The reading portion 13 is an image data reading/generating portion including an image sensor or an ADF (automatic document feeder) and configured to optically read an image of an original for generating image data, when the image processing device 1 performs its scanning function, copying function or facsimile transmission function. The printing portion 14 is an image forming portion constituted by a suitable printing mechanism such as an ink-jet printing mechanism or an electronic photoconductive printing mechanism and configured to form an image on a recording medium in the form of a sheet such as a sheet of paper, when the image processing device 1 performs the printing function, copying function or facsimile reception function.

The memory 16 consists of a volatile memory such as a DRAM, and a non-volatile memory which consists of a non-reloadable ROM or which includes a reloadable EEPROM, a flash memory or an NVRAM.

On the other hand, the wireless LAN communication portion 15 of the image processing device 1 is different from a wireless LAN communication portion provided in the MFP commonly known in the art. The wireless LAN communication portion 15 is provided for wireless communication with the communicating device 2. Some models of the commonly known MFP which are members of a wireless network include a wireless LAN communication portion. Unlike this wireless LAN communication portion of the commonly known MFP, the wireless LAN communication portion 15 is not only connected to the wireless network, but also configured to implement wireless communication with the communicating device 2. In this respect, the present image transmission system including the image processing device 1 and the communicating portion 2 is different from the commonly known MFP which does not include the communicating portion 2.

In the present image processing device 1, the wireless LAN communication portion 15 is constructed in conformity with wireless LAN standards (e.g., IEEE802.11 standards: IEEE802.11a; IEEE802.11b; IEEE802.11g; etc.), and is configured to switch the communication mode of the image processing device 1 between the above-described infrastructure mode and ad hoc mode.

When the image processing device 1 is placed in the infrastructure mode, the image processing device 1 is connected to the access point 3 in a wireless fashion, and is communicable with the communicating device 2 through the access point 3, as indicated in FIG. 1A. When the image processing device 1 is placed in the ad hoc mode, the image processing device 1 is communicable directly with the communicating device 2, as indicated in FIG. 1B.

Figure 2B:
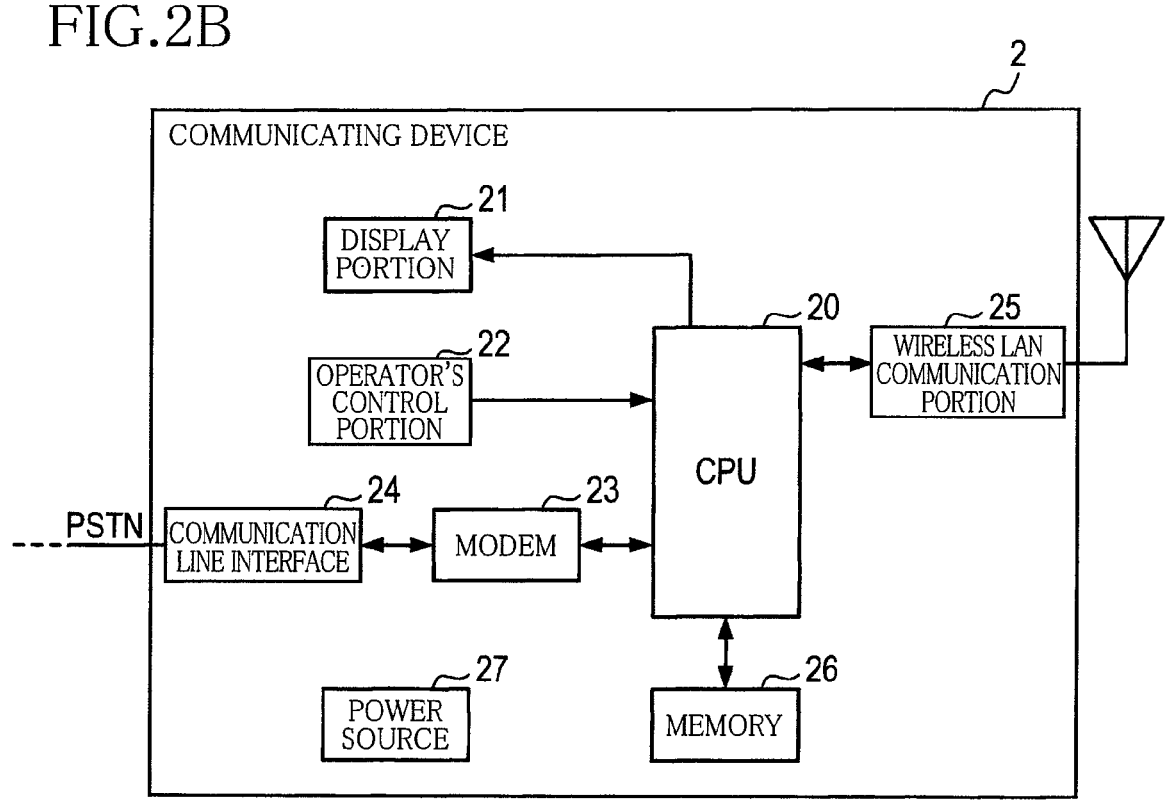

As shown in FIG. 2B, the communicating device 2 includes a CPU 20, a display portion 21, an operator's control portion 22, a MODEM 23, a communication line interface 24, a wireless LAN communication portion 25, a memory 26 and a power source 27.

The CPU 20 is a control portion configured to control the other portions of the communicating device 2, according to control programs stored in the memory 26. The display portion 21 is an output portion including a suitable display device such as a liquid crystal display (LCD) configured to display or indicate various kinds of information. For instance, the display portion 21 displays a history of facsimile and telephone transmissions and receptions to and from the external facsimile device 5 through the PSTN 4. The operator's control portion 22 is an input portion having key switches or a touch panel and configured to enable the user of the image transmission system to input various signals for the communicating device 2 to perform various functions.

The MODEM 23 and the communication line interface 24 are provided in the commonly known MFP, but are not provided in the image processing device 1. The MODEM 23 is a converter portion configured to convert one of digital data and audio signals into the other, while the communication line interface 24 is a communication processing portion configured to perform processing operations for telephone and facsimile communication with any external device such as the external facsimile device 5, for instance, to perform calling and call-accepting operations for the telephone and facsimile transmission and reception. The communication line interface 24 functions as an image transmission/reception portion configured to transmit and receive an image to and from the external device through a facsimile communication function.

The memory 26 consists of a volatile memory such as a DRAM, and a non-volatile memory which consists of a non-reloadable ROM or which includes a reloadable EEPROM, a flash memory or an NVRAM.

The wireless LAN communication portion 25 of the communicating device 2 is provided for wireless communication with the image processing device 1. Like the wireless LAN communication portion 15 of the image processing device 1, the wireless LAN communication portion 25 is constructed in conformity with wireless LAN standards (e.g., IEEE802.11 standards: IEEE802.11a; IEEE802.11b; IEEE802.11g; etc.), and is configured to switch the communication mode of the communicating device 2 between the infrastructure mode and the ad hoc mode.

When the communicating device 2 is placed in the infrastructure mode, the communicating device 2 is connected to the access point 3 in a wireless fashion, and is communicable with the image processing device 1 through the access point 3, as indicated in FIG. 1A. When the communicating device 2 is placed in the ad hoc mode, the communicating device 2 is communicable directly with the image processing device 1, as indicated in FIG. 1B.

The image processing device 1 and communicating device 2 which are constructed as described above cooperate with each other to operate as the image transmission system, which performs substantially the same functions as a conventional MFP (multi-function peripheral device) or facsimile device. The image processing device 1 is assigned to function primarily as an image input and output portion of the image transmission system for reading, printing and displaying an image, while the communicating device 2 is assigned to function primarily as a communicating portion for communication with any external device such as the facsimile device 5 outside the image transmission system.

Described in detail, when an image is transmitted to the external device from the image transmission system including the image processing device 1 and communicating device 2, the image is read by the reading portion 13 of the image processing device 1, and is transmitted in a wireless LAN communication fashion from the wireless LAN communication portion 15 to the wireless LAN communication portion 25 of the communicating device 2. The image received by the communicating device 2 is transmitted to the external device (external facsimile device 5) through the MODEM 23 and communication line interface 24 of the communicating device 2 and through the PSTN 4.

When an image is transmitted from the external device (external facsimile device 5) through the PSTN 4 to the image transmission system, the transmitted image is received by the MODEM 23 through the communication line interface 24 of the communicating device 2, and is transmitted from the wireless LAN communication portion 25 to the wireless LAN communication portion 15 of the image processing device 1. The image received by the wireless LAN communication portion 15 is displayed on the display portion 11 or printed by the printing portion 14.

<Control Routine Executed by Image Processing Device 1 and Communicating Device 2>

Referring next to the flow charts of FIGS. 3-6, there will be described a control routine executed by the image processing device 1 and communicating device 2 of the image transmission system constructed as described above according to the present embodiment. It is noted that the flow charts of FIGS. 3-6 show selected portions of the control routine executed commonly by the image processing device 1 and communicating device 2, which portions are important to understand the principle of the present invention.

Figure 3:
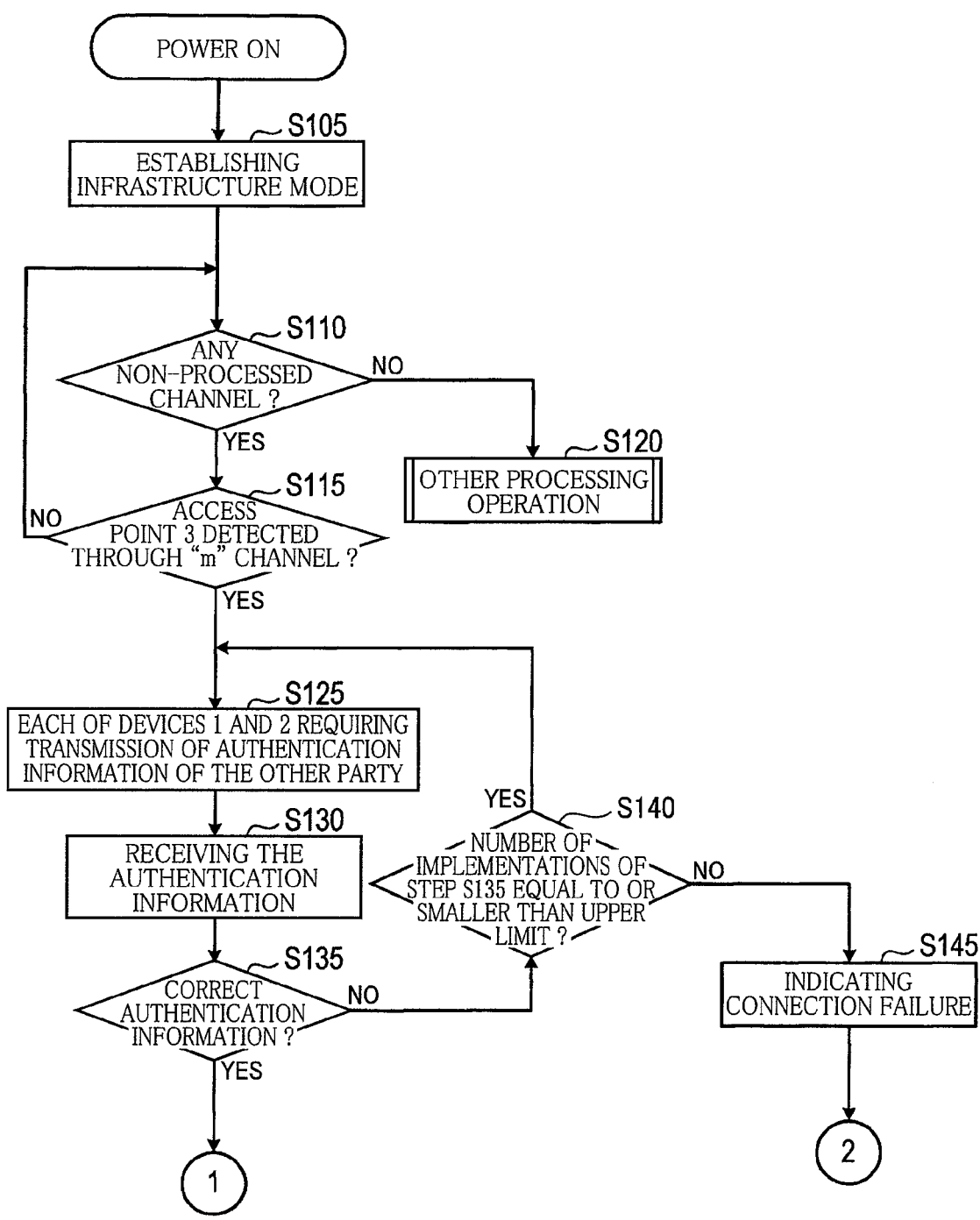
FIG. 3 is a flow chart illustrating a first part of a control routine executed by the image processing device and the communicating device.

When power is applied to the image processing device 1 and communicating device 2, the CPU 10, 20 of the devices 1, 2 initiates the control routine, the first or initial part of which is illustrated in FIG. 3.

Namely, the control routine is initiated with step S105 to establish the infrastructure mode by setting wireless parameters for the infrastructure mode. The wireless parameters are initially set by the user of the image transmission system, who has already set the access point 3 with respect to the wireless network and therefore knows the contents of the setting. The user has set the wireless parameters, in accordance with the contents of the setting of the access point 3, and the set wireless parameters are stored in the memories 16, 26. In step S105, the CPU 10, 20 reads out the stored wireless parameters from the memory 16, 26 to set the wireless parameters for the wireless LAN communication portion 15, 25.

Step S105 is followed by step S110 to determine whether a plurality of usable channels of the wireless LAN communication portion 15, include any non-processed channel. If an affirmative determination (YES) is obtained in step S110, the control flow goes to step S115 to scan the non-processed channel.

If the scanned non-processed channel is a channel used by the access point 3, the access point 3 is detected in step S115. If the scanned non-process channel is not a channel used by the access point 3, the access point 3 is not detected in step S115.

If a negative determination (NO) is obtained in step S115 without detection of the access point 3, the control flow goes back to step S110 to determine whether there is still a non-processed channel in the usable channels of the wireless LAN communication portion 15. If the affirmative determination (YES) is obtained again in step S110, the control flow goes to S115. Steps S110 and S115 are repeatedly implemented as long as the affirmative determination (YES) is obtained in step S110.

If a negative determination (NO) is obtained in step S110 with all non-process channels have been processed, it is not possible to establish the infrastructure mode. In this case, the control flow goes to step S120 to perform other processing operations such as an operation to display an error message for informing the operator of an abnormality, or an operation to establish the ad hoc mode in place of the infrastructure mode. Since the operation in step S120 is not important to understand the principle of this invention, no further description of the step S120 is deemed necessary.

If an affirmative determination (YES) is obtained in step S115 as a result of detection of the access point 3 during repeated implementation of steps S110 and S115, the control flow goes further to step S125. In the present specific example in the illustrated embodiment, the affirmative determination (YES) is obtained in step S115 with the access point 3 being detected through an "m" channel.

If the affirmative determination (YES) is obtained in step S115 with the access point 3 being detected through "m" channel, each one of the CPU 10 of the image processing device 1 and the CPU 20 of the communicating device 2 requires the other party to transmit authentication information of that other device 1, 2 through the wireless LAN communication portion 15, 25. Namely, the CPU 10 requires the CPU 20 to transmit the authentication information of the communicating device 2, while the CPU 20 requires the CPU 10 to transmit the authentication information of the image processing device 1.

The authentication information to be transmitted from the image processing device 1 to the communicating device 2 and the authentication information to be transmitted from the communicating device 2 to the image processing device 1 are information necessary to confirm that each one of the image processing device 1 and the communicating device 2 is a correct party (the other party) for communication. For instance, the authentication information includes information recognized by the image processing device 1 and communicating device 2 but not recognized by the other devices, or encryption information that can be decoded by only the image processing device 1 and communicating device 2.

In the next step S130, the authentication information of the other party transmitted in response to the requirement made in step S125. Step S130 is followed by step S135 in which the received authentication information of the other party is checked to determine whether the authentication information of the other party is correct authentication information, that is, matches the information stored in the own memory 16, 26.

If the received authentication information is not the correct authentication information, a negative determination (NO) is obtained in step S135, and the control flow goes to step S140 to determine whether the number of implementations of step S135 (steps S125-S135) is equal to or smaller than a predetermined upper limit. If an affirmative determination (YES) is obtained in step S140 with the number of implementations being not larger than the upper limit, the control flow goes back to step S125. Thus, if the received authentication information of the other party is not correct, the steps S125-S140 are repeatedly implemented by the maximum number of times equal to the upper limit.

The negative determination (NO) is obtained in step S135 if the authentication information is not received within a predetermined length of time after the moment of the requirement in step S125, as well as if the received authentication information is not correct.

Figure 4:
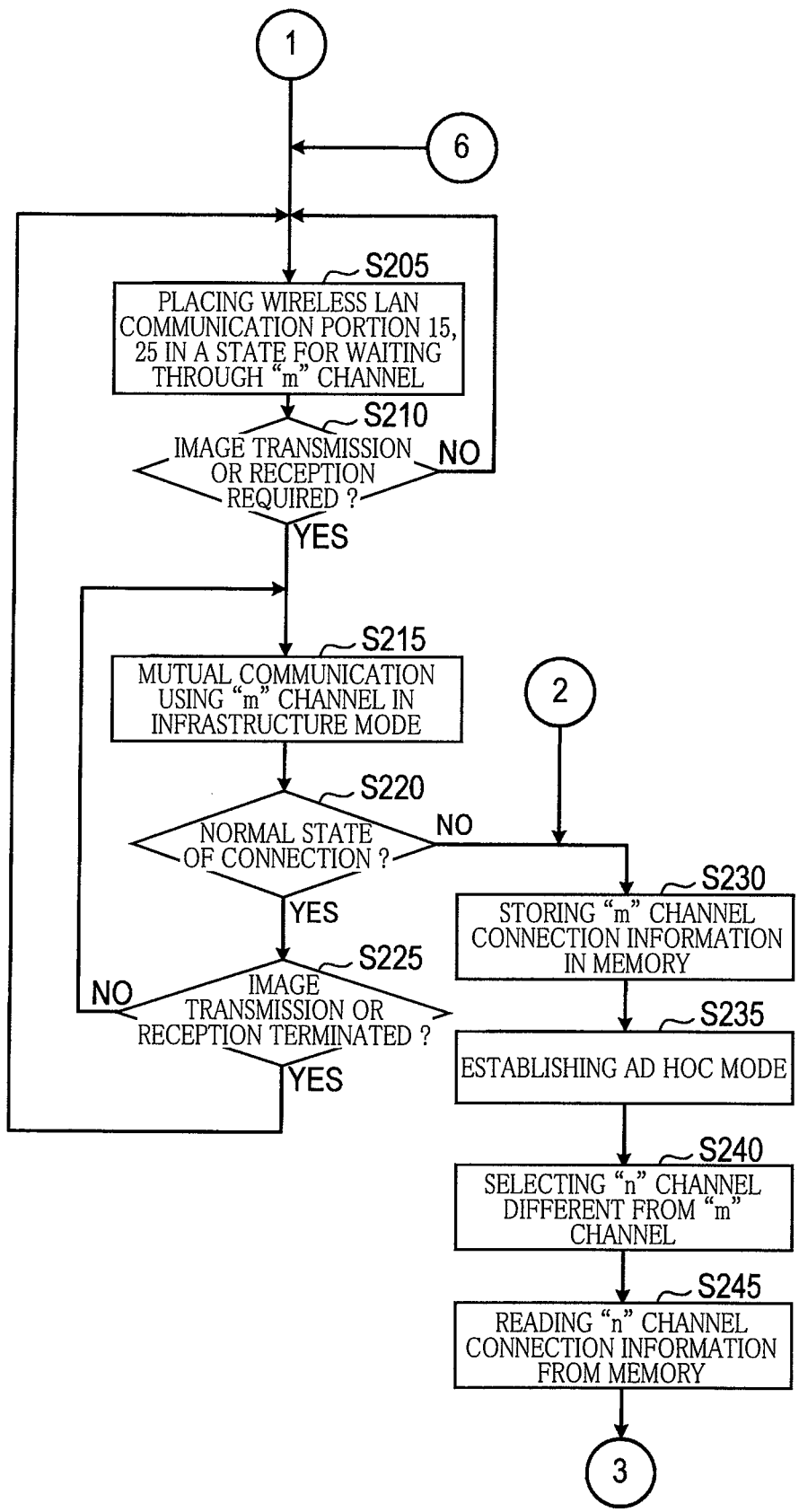
FIG. 4 is a flow chart illustrating a second part of the above-indicated control routine.

If an affirmative determination (YES) is obtained in step S135 with the correct authentication information received during repeated implementations of steps S125-S140, the control flow goes to step S205 indicated in FIG. 4. If a negative determination (NO) is obtained in step S140 with the number of repeated implementations of steps S125-S140 exceeding the upper limit, the control flow goes to step S145 in which the display portion 11, 21 displays an error message or an icon indicating that the correct authentication information of the other party has not been received. In this case, the control flow goes to step S230 also indicated in FIG. 4.

In the step S205, the CPU 10, 20 places the wireless LAN communication portion 15, 25 in a state for waiting through the "m" channel. Then, the control flow goes to step S210 to determine whether image transmission or reception is required. If a negative determination (NO) is obtained in step S210, the control flow goes back to step S205. The steps S205 and S210 are repeatedly implemented until the image transmission or reception is required.

When the image processing device 1 becomes ready to transmit an image to the communicating device 2 after the image is read by the reading portion 13 as a result of an operation by the user, for example, the CPU 10 of the image processing device 1 determines in step S210 that the image transmission is required. When the image processing device 1 has notified the communicating device 2 that the image transmission from the image processing device 1 will be initiated, the CPU 20 of the communicating device 2 determines in step S210 that the image reception is required.

When the communicating device 2 becomes ready to transmit an image to the image processing device 1 after the image has been received from the external facsimile device 5, the CPU 20 determines in step S210 that the image transmission is required. When the communicating device 2 has notified the image processing device 1 that the image transmission from the communicating device 2 will be initiated, the CPU 10 determines in step S210 that the image reception is required.

If an affirmative determination (YES) is obtained in step S210 during repeated implementations of steps S125-S210, the control flow goes to step S215 in which the wireless LAN communication portions 15, 25 implement mutual communication with each other using the "m" channel in the infrastructure mode.

During the communication in the infrastructure mode in step S215, step S220 is implemented to determine whether the state of connection between the devices 1 and 2 in the infrastructure mode is normal. If an affirmative determination (YES) is obtained in step S220, the control flow goes to step S225 to determine whether the image transmission or reception is terminated. If a negative determination (NO) is obtained in step S225, the control flow goes back to step S215. Steps S215-S225 are repeatedly implemented until the image transmission or reception is terminated without an abnormality in the state of connection between the two devices 1, 2.

When an affirmative determination (YES) is obtained in step S225 with the image transmission or reception being terminated, the control flow goes back to step S205 in which the CPU 10, 25 places its wireless LAN communication portion 15, 25 again in the state for waiting through the "m" channel. Thus, steps S205-S225 are repeatedly implemented.

If the state of connection between the devices 1, 2 becomes abnormal for some reason or other, a negative determination (NO) is obtained in step S220, and the control flow goes to step S230. This step S230 is also implemented if the step S145 indicated in FIG. 3 is implemented as described above.

Where the step S230 and the following steps are implemented with the negative determination (NO) being obtained in step S220, the communication in the infrastructure mode is interrupted, and the ad hoc mode is established in place of the infrastructure mode. Described in greater detail, the step S230 is implemented to store in the memory 16, 26 "m" channel connection information, which is information on the "m" channel necessary for communication with the access point 3. The "m" channel has been detected by the CPU 10, 20 in steps S110 and S115 described above.

Step S230 is followed by step S235 in which the CPU 10, 20 sets the wireless parameters necessary for initiating the wireless communication in the ad hoc mode. The wireless parameters for the ad hoc mode were stored in the memories 16, 26 prior to shipment of the image processing device 1 and communicating device 2 from a manufacturer to the user, and cannot be re-written by the user. Namely, information for permitting direct mutual communication of the image processing device 1 and communicating device 2 that are shipped together from the manufacturer is stored in the memories 16, 26, so that the CPU 10, 20 reads out the contents of the memories 16, 26, in step S235 for setting the wireless LAN communication portion 15, 25.

The wireless parameter information for establishing the direct mutual communication between a pair of devices 1 and 2 shipped together is different from that for the direct mutual communication between another pair of devices 1 and 2 shipped together, even where the two pairs of devices 1 and 2 are of the same models. Accordingly, the two devices 1 and 2 are not communicable with each other in the ad hoc mode, if the two devices 1 and 2 have not been shipped together as a pair of devices 1 and 2. For example, the image processing device 1 is not communicable with the communicating device 2 if the communication device 2 has not been shipped together with the image processing device 1.

Step S235 is followed by step S240 in which the CPU 10, 20 selects an "n" channel for the ad hoc mode. This "n" channel is different from the "m" channel used in the infrastructure mode.

Only two channels of different numbers are selectable for the ad hoc mode. That is, step S240 is implemented to provisionally select a predetermined one of these two different channels, and to finally select the provisionally selected channel as the "n" channel if the provisionally selected channel is different from the "m" channel used for the infrastructure mode, or finally select the other of the above-indicated two different channels as the "n" channel if the provisionally selected channel is identical with the "m" channel. Thus, the "n" channel different from the "m" channel is selected for the ad hoc mode in step S240.

Figure 5:
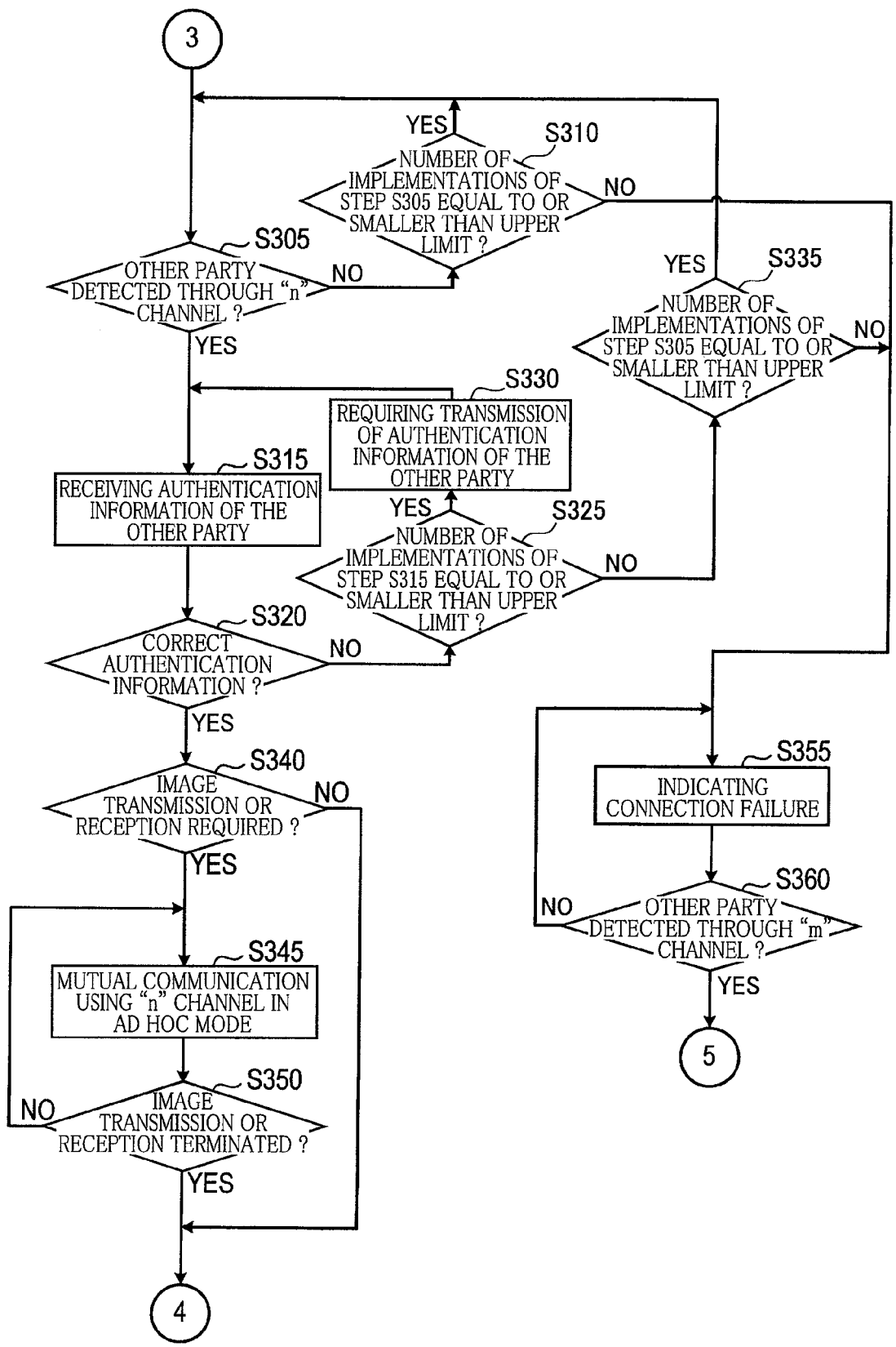
FIG. 5 is a flow chart illustrating a third part of the above-indicated control routine.

After the "n" channel has been selected in step S240, the control flow goes to step S245 to read "n" channel connection information from the memory, and then to step S305 indicated in FIG. 5. In the step S305, the "n" channel is scanned according to the "n" channel information read out in step S245.

In step S305, an affirmative determination (YES) is obtained in the image processing device 1 if the other party (communicating device 2) is detected through the "n" channel as a result of initiation of communication with the image processing device 1 using the "n" channel, and is obtained in the communicating device 2 if the other party (image processing device 1) is detected through the "n" channel as a result of initiation of communication with the communicating device 2 using the "n" channel. If the other part is not detected, a negative determination (NO) is obtained in step S305.

If the negative determination (NO) is obtained in step S305, the control flow goes to step S310 to determine whether the number of implementations of step S305 is equal to or smaller than a predetermined upper limit. If a affirmative determination (YES) is obtained in step S310, the control floe goes back to step S305. Thus, the CPU 10, 20 of the device 1, 2 which has not detected the other party repeatedly implements steps S305 and S310 by the maximum number of times equal to the upper limit.

If the correct other party is detected through the "n" channel during repeated implementations of step S305, an affirmative determination (YES) is obtained in step S305. In this case, the control flow goes to step S315 in which the CPU 10, 20 receives authentication information of the other party through its wireless LAN communication portion 15, 25. The authentication information has been described with respect to step S125. After the authentication information of the other party has been received in step S315, the control flow goes to step S320 to determine whether the received authentication is correct authentication information, that is, matches the information stored in the own memory 16, 26.

If it is determined in step S320 the received authentication information of the other party is not correct, that is, if a negative determination (NO) is obtained in step S320, the control flow goes to step S325 to determine whether the number of implementations of step S320 (steps S330, S315 and S320) is equal to or smaller than a predetermined upper limit.

If an affirmative determination (YES) is obtained in step S325 with the number of implementations being not larger than the upper limit, the control flow goes to step S330 in which the CPU 10, 20 requires the other party to transmit the authentication information of the other party, through the wireless LAN communication portion 15, 25. Then, the control flow goes back to step S315. Thus, if the received authentication information of the other party is not correct, the steps S315-S330 are repeatedly implemented by the maximum number of times equal to the upper limit.

The negative determination (NO) is obtained in step S320 if the authentication information is not received within a predetermined length of time after the moment of the requirement in step S330, as well as if the received authentication information is not correct, as described above with respect to the step S135.

If an affirmative determination (YES) is obtained in step S320 with the correct authentication information received during repeated implementations of steps S315-S330, the control flow goes to step S340 to determine whether image transmission or reception is required.

An affirmative determination (YES) is obtained in step S340 if the communication between the image processing device 1 and communicating device 2 is interrupted due to abnormal connection therebetween detected in step S220 prior to the termination of the image transmission or reception during repeated implementations of steps S215-S225 in the infrastructure mode.

If the affirmative determination (YES) is obtained in step S340, the control flow goes to step S345 in which the CPUs 10, 20 implement mutual communication with each other through the "n" channel in the ad hoc mode, through the wireless LAN communication portions 15, 25. Then, the control flow goes to step S350 to determine whether the image transmission or reception is terminated. If a negative determination (NO) is obtained in S350, the control flow goes back to step S345. Thus, steps S345 and S350 are repeatedly implemented until the image transmission or reception is terminated.

Figure 6:
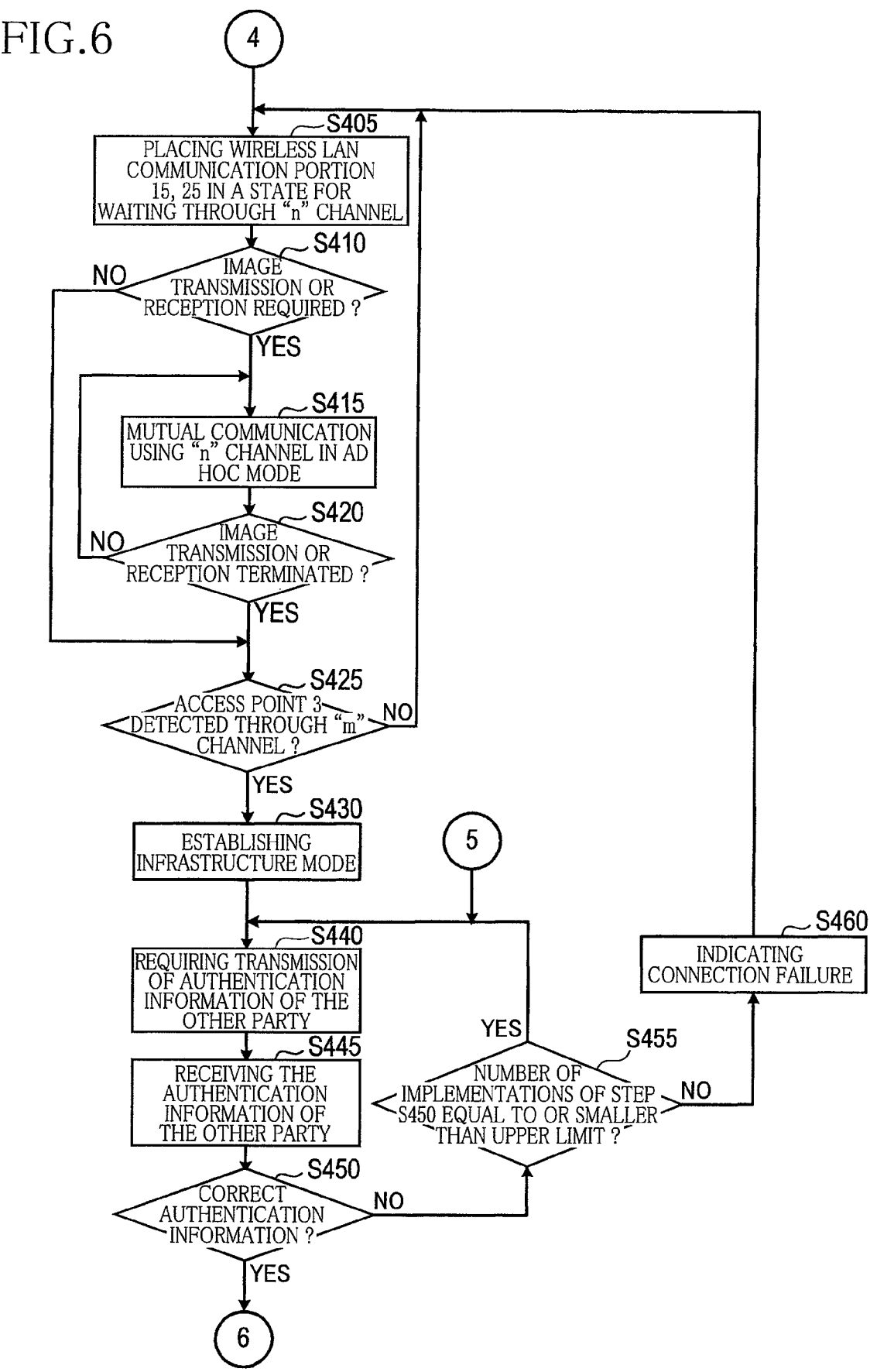
FIG. 6 is a flow chart illustrating a fourth part of the above-indicated control routine.

If an affirmative determination (YES) is obtained in step S350 during repeated implementations of steps S340-S350, the control flow goes to step S405 indicated in FIG. 6. The control flow also goes to step S405 if a negative determination (NO) is obtained in step S340 described above.

If a negative determination (NO) is obtained in step S325, that is, if the number of implementations of step S320 exceeds the upper limit, this means that it is not possible to receive the correct authentication information of the other party. In this case, there is a possibility that the mutual communication using the "n" channel is not possible, and the control flow goes to step S335 to determine whether number of implementations of step S305 is equal to or smaller than a predetermined upper limit.

If an affirmative determination (YES) is obtained in step S335, the control flow goes back to step S305 to scan again the "n" channel, and to the following steps S315-S330.

If a negative determination (NO) is obtained in step S310 or S335 with the number of repeated implementations of step S305 exceeding the upper limit, it is determined that it is not possible to effect the communication using the "n" channel, and the control flow goes to step S355.

In step S355, the display portion 11, 21 displays an error message or an icon indicating a failure of connection between the image processing device 1 and the communicating device 2. In this case, the control flow goes to step S360 to scan the "m" channel. It will be understood from the foregoing description that the step S360 is implemented where the abnormal connection is detected in step S220 in spite of the detection of the access point 3 through the "m" channel in step S115, and where it is determined in step S305 that the communication using the "n" channel is not possible.

In view of the fact described just above, steps S355 and S360 are repeatedly implemented to determine whether the access point 3 is detected through the "m" channel, even if a negative determination (NO) is obtained in step S360 as a result of a failure to detect the access point 3 through the "m" channel. That is, the determination as to whether the access point 3 is detected through the "m" channel is repeated if the negative determination is obtained in step S360.

If an affirmative determination (YES) is obtained in step S360 as a result of detection of the access point 3 through the "m" channel, the control flow goes to step S440 indicated in FIG. 6.

When step S405 is implemented following the negative determination (NO) in step S340 or the affirmative determination (YES) in step S350, the CPU 10, 20 places the wireless LAN communication portion 15, 25 in the state for waiting through the "n" channel. Then, the control flow goes to step S410 to determine whether the image transmission or reception is necessary.

If an affirmative determination (YES) is obtained in step S410, the control flow goes to step S415 in which the CPUs 10, 20 implement mutual communication with each other using the "n" channel in the ad hoc mode, through the wireless LAN communication portions 15, 25.

Then, the control flow goes to step S420 to determine whether the image transmission or reception is terminated. If a negative determination (NO) is obtained in S420, the control flow goes back to step S415. Thus, steps S415 and S420 are repeatedly implemented.

If an affirmative determination (YES) is obtained in step S420 during repeated implementations of steps S415-S420, the control flow goes to step S425. The control flow also goes to step S425 if a negative determination (NO) is obtained in step S410 described above.

Step S425 is implemented to scan the "m" channel, namely, to determine again whether the access point 3 is detected through the "m" channel. If a negative determination (NO) is obtained in step S425 due to a continued failure of communication using the "m" channel, or due to a defect of the access point 3 the control flow goes back to step S405 and the following steps.

If the communication using the "m" channel becomes possible as a result of removal of a cause for the failure of the communication, the access point 3 is detected through the "m" channel, and an affirmative determination (YES) is obtained in step S425. In this case, the CPU 10, 20 interrupts the communication in the ad hoc mode and to establish again the infrastructure mode in place of the ad hoc mode.

Described in detail, the control flow goes to step S430 in which the CPU 10, 20 sets the wireless parameters necessary to initiate the communication in the infrastructure mode, in substantially the same manner as described above in step S105. In step S430, however, the channel setting is effected according to the "m" channel connection information stored in the memory 16, 26 in step S230. Accordingly, it is not necessary to implement steps similar to the steps S110 and S115 which are implemented immediately after the power application, so that the wireless connection to the access point 3 can be made in a shorter time.

Step S430 is followed by step S440. This step S440 is implemented also when the affirmative determination (YES) is obtained in step S360 indicated in FIG. 5, as described above. In step S440, the CPU 10, requires the other party to transmit authentication information of that other device 1, 2 through the wireless LAN communication portion 15, 25. The authentication information has been described above with respect to step S125. Step S440 is followed by step S445 to receive the authentication information transmitted from the other party. The control flow then goes to step S450 to check the received authentication information, for determining whether the authentication information matches the information stored in the own memory 16, 26.

If the received authentication information is not the correct authentication information, a negative determination (NO) is obtained in step S450, and the control flow goes to step S455 to determine whether the number of implementations of step S450 (steps S440-S450) is equal to or smaller than a predetermined upper limit. If an affirmative determination (YES) is obtained in step S455, the control flow goes back to step S440. Thus, if the received authentication information of the other party is not correct, the steps S440-S450 are repeatedly implemented by the maximum number of times equal to the upper limit.

If an affirmative determination (YES) is obtained in step S450 with the correct authentication information received during repeated implementations of steps S440-S450, the control flow goes to back to step S205 indicated in FIG. 4. Thus, the image processing device 1 and communicating device 2 are restored to the infrastructure mode for communication using the "m" channel.

If a negative determination (NO) is obtained in step S455 with the number of repeated implementations of steps S440-S450 exceeding the upper limit, it is considered that the failure of communication using the "m" channel remains. In this case, the control flow goes to step S460 in which the display portion 11, 21 displays an error message or an icon indicating that the correct authentication information of the other party has not been received. In this case, the control flow goes to step S405, so that the image processing device 1 and communicating device 2 are kept in the state for communication in the ad hoc mode using the "n" channel.

Figure 7:
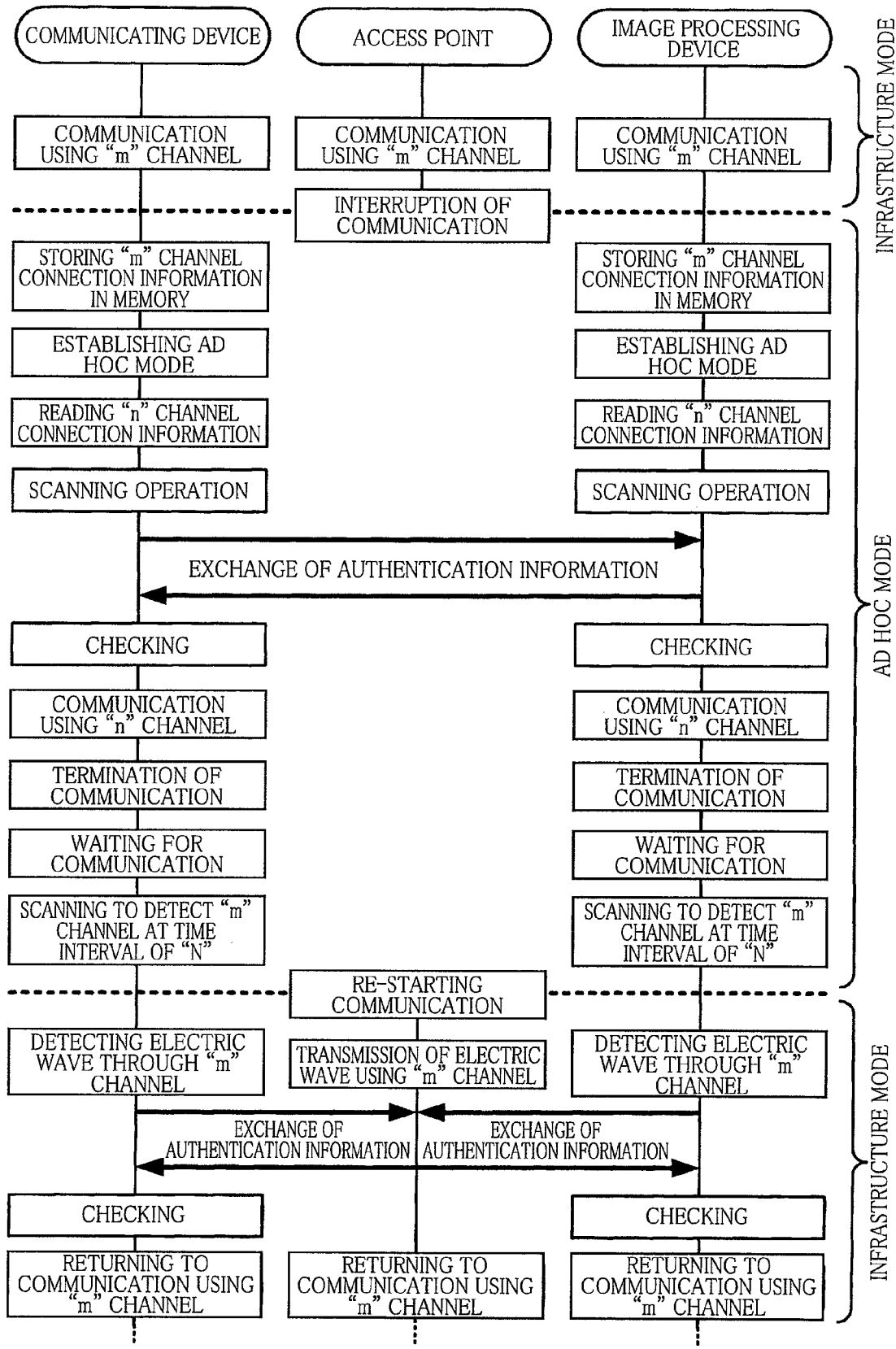
FIG. 7 is a sequence chart indicating states of communication of the image processing device, the communicating device and an access point of the above-indicated image transmission system of FIGS. 1A and 1B.

As a result of execution of the control routine by each of the image processing device 1 and communicating device 2 as described above, the communications are effected among the three members of the image transmission system consisting of the image processing device 1, communicating device 2 and access point 3, as illustrated in the sequence chart of FIG. 7, by way of example.

Described more specifically, the image processing device 1 and communicating device 2 initially implement the above-described steps S105-S225 to enable the communicating device 2 and access point 3 to make the wireless connection through the "m" channel, so that the image processing device 1 and the communicating device 2 become communicable with each other through the access point 3 in the infrastructure mode.

If the communication between the image processing device 1 and communicating device 2 is interrupted due to power removal from the access point 3 or a defect of the access point 3, the negative determination (NO) is obtained in the step S220, and the control flow goes to the step S230 to store the "m" channel connection information in the memory, the step S235 to establish the ad hoc mode, the step S240 to read the "n" channel connection information, and the step S305 to perform the scanning operation for determining whether the other party is detected through the "n" channel.

If the scanning operation in the step S305 reveals the mutual recognition of each of the image processing device 1 and communicating device 2 as the other party, the image processing device 1 and communicating device 2 become communicable directly with each other in the ad hoc mode. Then, the steps S315-S330, etc. are implemented to exchange the authentication information and to check the received authentication information. If the received authentication information is determined to be the correct authentication information of the other party, the steps S340-S350 and S405-S420 are implemented to effect the communication using the "n" channel and to wait for the communication using the "n" channel. In addition, the step S425 is implemented to repeat the scanning operation at a predetermined time interval for determining whether the access point 3 is detected through the "m" channel.

If the access point 3 has re-started the communication while transmitting an electric wave using the "m" channel, the image processing device 1 and communicating device 2 detect the electric wave through the "m" channel in the step S425, the image processing device 1 and communicating device 2 become communicable with each other again through the access point 3 in the infrastructure mode, as a result of implementation of the step S430. Subsequently, the steps S440-S450, etc. are implemented to exchange the authentication information and check the received authentication information. If the received authentication information is correct, the control flow goes back to the step S205, so that the image processing device 1 and communication device 2 are restored to the state for communication using the "m" channel in the infrastructure mode.

<Advantages of Illustrated Embodiment>

As described above, the image transmission system constructed according to the present embodiment of the invention is configured to implement the steps S105-S135 to establish a first state of wireless connection between the image processing device 1 and communicating device 2 in the infrastructure mode, the steps S205-S225 to determine whether the first state of wireless connection is interrupted, and the steps S230-S320 to establish a second state of wireless connection between the devices 1, 2 in the ad hoc mode if it is determined that the first state of wireless connection is interrupted, so that the wireless communication is possible in the ad hoc mode in the steps S340-S350 and steps S405-S420, while the first state of wireless connection is interrupted.

Therefore, in the event of a failure of the image processing device 1 and communicating device 2 to recognize the access point 3 due to a defect of the access point 3, for instance, the communication mode of the image transmission system is changed from the infrastructure mode to the ad hoc mode to permit the image transmission between the image processing device 1 and communicating device 2.

It is also appreciated that the wireless parameters necessary to initiate the wireless communication in the ad hoc mode are set in the step S235, to establish the second state of wireless communication, on the basis of the information (corresponding to a "second communication setting information") which was set prior to shipment of the image transmission system and which cannot be re-written by the user of the image transmission system. Although the conventional image transmission system permits the user to change the wireless parameters for the ad hoc mode, the present image transmission system prevent an inadequate change of the wireless parameters for the ad hoc mode due to an erroneous operation by the user.

The present image transmission system is further configured to determine in the step S425 whether the wireless connection in the infrastructure mode becomes possible, after the wireless communication in the ad hoc mode is effected in the steps S405-S420, and to be restored to the wireless communication in the infrastructure mode by returning back to the step S205 if it is determined in the step S450 that the wireless connection in the infrastructure mode is established. Thus, a cumbersome manual operation by the user to restore the image transmission system from the ad hoc mode back to the infrastructure mode is not necessary. In other words, the image transmission system is automatically restored back to the infrastructure mode which is more convenient to the user.

In the image transmission system including the access point 3, the direct communication between the image processing device 1 and communicating device 2 in the ad hoc mode established even in the presence of the access point 3 would prevent an external wireless LAN device from communicating with the image processing device 1 through the access point 3. In this respect, the communication in the ad hoc mode is not convenient to the user.

In the present image transmission system, however, the ad hoc mode is established for permitting the direct communication between the image processing device 1 and communicating device 2 only while the communication through the access point 3 is not possible, but the communication mode is returned from the ad hoc mode to the infrastructure mode immediately after the communication through the access point 3 becomes possible again, whereby the present image transmission system permits the external wireless LAN device to communicate with the image processing device 1 through the access point 3, leading to an increased degree of convenience of the present image transmission system to the user.

The present image transmission system is further configured to implement the step S230, upon changing of the communication mode from the infrastructure mode to the ad hoc mode, to store in the memory 16, 26 (functioning as a "third communication-setting-information memory portion") the information necessary to re-establish the wireless connection in the infrastructure mode. Accordingly, it is possible to try to establish again the wireless connection through the "m" channel in the steps S430-S450 by utilizing the information stored in the memory 16, 26 immediately prior to the change to the ad hoc mode, that is, without having to perform again the processing operation (as performed in the steps S110 and S115, for example) which would be required for coordinating data that can be changed dynamically.

The present image transmission system is further configured to implement the steps S355 and S360 if the system fails to change the communication mode to the ad hoc mode (if the negative determination is obtained in the step S310 or S335), so that the system may be restored to the infrastructure mode, without a further operation to try to establish the ad hoc mode. Thus, the steps S355 and S360 increase an opportunity of restoring the image transmission system back to the infrastructure mode.

The present image transmission system is also arranged such that when the specific channel used for the infrastructure mode has a problem of communication, the communication mode is changed from the infrastructure mode to the ad hoc mode, by using the channel which is different from the specific channel used for the infrastructure mode. Accordingly, the present image transmission system has a higher possibility of removal of the problem of communication by changing the communication mode to the ad hoc mode.

Even where the image transmission system permits the user to manually change the channel for the infrastructure mode, the channel for the ad hoc mode is automatically selected in the step S240 so as to assure that the channel for the ad hoc mode is different from the channel used for the infrastructure mode. In this respect, too, the image transmission system has a higher possibility of removal of the problem of communication by changing the communication mode to the ad hoc mode.

It will be understood from the foregoing description of the present embodiment of the invention that the reading portion 13 configured to read an image to be transmitted through the facsimile transmission function of the image processing device 1 functions as an image input portion, while the display portion 11 configured to display the image received through the facsimile reception function of the device 1, and the printing portion 14 configured to print the received image cooperate to function as an image output portion.

It will also be understood that the information used in the step S105 corresponds to first communication setting information, while the memories 16, 26 storing this first communication setting information functions as a first communication-setting-information memory portion, and that the information used in the step S235 corresponds to second communication setting information, wile the memories 16, 26 storing this second communication setting information functions as a second communication-setting-information memory portion.

It will further be understood that the wireless communication hardware of the wireless LAN communication portions 15, and portions of the CPUs 10, 20 assigned to implement the steps S110-S135 and S205-S225 to control the wireless communication hardware of the wireless LAN communication portions 15, 25 cooperate to function as a first wireless connecting portion configured to establish first wireless connection between the image processing device 1 and communicating device 2 in the infrastructure mode, while the wireless communication hardware of the wireless LAN communication portions 15, 25 and portions of the CPUs 10, 20 assigned to implement the steps S235-S245, S305-S350 and S405-S420 to control the wireless communication hardware of the wireless LAN communication portions 15, 25 cooperate to function as a second wireless connecting portion configured to establish second wireless connection between the two devices 1, 2 in the ad hoc mode. The first wireless connecting portion includes a communication-channel specifying portion (S115) configured to specify a communication channel through which the image processing device 1 and communicating device 2 communicate with each other through the access point 3.

It will also be understood that portions of the CPUs 10, 20 assigned to implement the steps S115, S135, S140, S220, S310, S320, S325, S335, S360, S410, S420, S425, S450, S455, etc. cooperate to function as a communication control portion configured to switch the image transmission system between the wireless connection in the infrastructure mode and the wireless connection in the ac hoc mode. The communication control portion includes a connection checking portion (S220) configured to detect, in the state for wireless communication in the infrastructure mode, a state in which the first wireless connection once established by the first wireless connecting portion cannot be maintained, and a transmission/reception requirement determining portion (S410) configured to determine whether one of the two devices 1, 2 is required to transmit an image to the other or to receive an image from the other, in the state for wireless communication in the ad hoc mode. The communication control portion further includes a transmission/reception termination determining portion (S420) configured to determine whether the transmission of an image from one of the two devices 1, 2 to the other or the reception of the image by the other in the state for wireless communication in the ad hoc mode is terminated.

It will further be understood that the information used in the step S430 corresponds to third communication setting information, while the memories 16, 26 storing this third communication setting information function as the third communication-setting-information memory portion described above with respect to the step S430.

<Modifications of Illustrated Embodiment>

While the preferred embodiment of the present invention has been described by reference to the drawings, for illustrative purpose only, it is to be understood that the present invention is not limited to the details of the illustrated embodiment, but may be otherwise embodied.

In the illustrated embodiment, the steps S355 and S360 are repeatedly implemented to scan the "m" channel. However, the step S355 may be modified to scan both of the "m" and "n" channels, for determining whether the other party is detected through either of the "m" and "n" channels. In this case, the wireless connection between the image processing device 1 and communicating device 2 is established when the cause for the problem of communication through the "n" channel is removed in the continued presence of the problem of communication through the "m" channel. Even if the cause for the problem of communication through the "m" channel is removed a short time after the wireless connection through the "n" channel is established, however, the processing operation to establish the wireless connection through the "m"

channel is more or less delayed. In this respect, whether only the "m" channel is scanned or both of the "m" and "n" channels are scanned should be selected in view of the factors described above.

In the illustrated embodiment, the "n" channel different from the "m" channel is selected in the step S240. If the purpose of switching the communication mode from the infrastructure mode to the ad hoc mode is to deal with a defect of the access point 3 per se rather than to deal with a radio wave interference or hindrance, the "m" channel may be selected in the step S240. It is not essential to select the "n" channel different from the "m" channel, in view of a possibility that the image processing device 1 and the communication device 2 that are located relatively close to each other become communicable with each other by switching the communication mode to the ad hoc mode in the event of interruption of the wireless connection of the device 1, 2 with the access point 3 that is relatively distant from the device 1, 2, in the presence of a radio wave interference or hindrance with respect to the given channel.

In the image transmission system according to the illustrated embodiment, the CPU 10, 20 implements the step S230 to store in the memory 16, 26 the "m" channel connection information relating to the channel for communication with the access point 3. However, the step S230 may be modified such that the "m" channel connection information is stored in the memory 16, 26 in relation to the network information with regard to the specific access point 3 (detected through the "m" channel in the step S115) stored in the memory 16, 26. This modification makes it possible to relate the network information detected through the "m" channel, to the "m" channel connection information, even where the image processing device 1 and communicating device 2 of the image transmission system have the network information relating to a plurality of access points. Accordingly, the wireless connection in the infrastructure mode can be rapidly established.

In the image transmission system according to the illustrated embodiment, the wireless parameters which are set by the CPU 10, 20 in the step S235 and which are necessary to initiate the communication in the ad hoc mode were stored in the memory 16, 26 prior to the shipment of the image processing device 1 and communicating device 2 from the manufacturer to the user, and cannot be re-written by the user. However, the wireless parameters for the ad hoc mode, that cannot be re-written, may be re-written in a specific manner by service engineers. In this case, the service engineers can change the wireless parameters stored in a new image processing device 1 to be used in place of the defective image processing device 1, so that the new image processing device 1 is communicable with the existing communicating device 2 in the ad hoc mode. In this case, either, the user cannot change the wireless parameters for the ad hoc mode, preventing an erroneous setting of the wireless parameters by the user, which would result in a failure of the wireless connection in the ad hoc mode.

The communicating device 2 which is communicable with the external devices through the PSTN 4 may be configured to be operable as a telephone set incorporating various devices such as a telephone receiver, a telephone answering device, a message recorder and a telephone-number memory. A telephone system may be constituted by this telephone set in the form of the communicating device 2 functioning as a parent unit, and at least one child unit each in the form of a cordless unit. In this case, the communicating device 2 includes a second wireless LAN communication portion in addition to the first wireless LAN communication portion 25, for communication of the parent unit with the cordless child unit or units. Alternatively, each cordless child unit is provided with a wireless communication interface for communication with the wireless LAN communication portion 25.

While, the image processing device 1 of the image transmission system according to the illustrated embodiment has an image input portion in the form of the reading portion 13, the image input portion may be arranged to receive an image from image files stored in a memory card, or image data transmitted from external devices such as a PC. While the image processing device 1 has an image output portion in the form of the display portion 11 and printing portion 14, the image output portion may be arranged to store image data in a memory card or to transmit the image data to the external PC or other devices.

What is claimed is:

1. An image transmission system comprising:
   an image processing device having an image input portion configured to input an image, an image output portion configured to output an image, and a first wireless LAN communication portion configured to effect wireless communication through its wireless LAN function; and
   a communicating device having an image transmission/reception portion configured to transmit and receive an image to and from an external device through its facsimile communication function, and a second wireless LAN communication portion configured to effect wireless communication through its wireless LAN function,
   wherein the image input through the image input portion is transmitted from the first wireless LAN communication portion of the image processing device to the communicating device and is then transmitted from the image transmission/reception portion to the external device,
   and wherein an image transmitted from the external device is received by the image transmission/reception portion of the communicating device, transmitted from the second wireless LAN communication portion to the image processing device, and output by the image output portion,
   each of the image processing device and the communicating device including:
   a first communication-setting-information memory portion for storing first communication setting information which is set by a user of the image transmission system and which is necessary for establishing first wireless connection between the image processing device and communicating device through the wireless LAN function in an infrastructure mode in which the image processing device and communicating device are communicable with each other through an access point;
   a second communication-setting-information memory portion for storing second communication setting information which has been set without an operation by the user and cannot be changed by the user and which is necessary to establish second wireless connection between the image processing device and communicating device through the wireless LAN function in an ad hoc mode in which the image processing device and communicating device are communicable directly with each other;
   a first wireless connecting portion configured to establish the first wireless connection in the infrastructure mode on the basis of the first communication setting information;
   a second wireless connecting portion configured to establish the second wireless connection in the ad hoc mode on the basis of the second communication setting information; and a communication control portion configured to command the first wireless connecting portion to try to establish the first wireless connection, to place the image processing device and communicating device in a state for wireless communication in the infrastructure mode after the first wireless connection is established, to command the second wireless connecting portion to try to establish the second wireless connection if the first wireless connection cannot be maintained, and to switch a communication mode of the image transmission system from the infrastructure mode to the ad hoc mode after the second wireless connection is established, wherein the communication control portion includes a transmission/reception requirement determining portion configured to determine, when the ad hoc mode has been kept, whether one of the image processing device and communicating device is required to transmit an image to the other or to receive an image from the other in the state for wireless communication in the ad hoc mode, the communication control portion commanding the first wireless connecting portion to try to establish the first wireless connection, if the transmission/reception requirement determining portion determines that the one of the image processing device and communicating device is not required to transmit the image to the other or to receive the image from the other.

2. The image transmission system according to claim 1, wherein the communication control portion includes a connection checking portion configured to detect, in the state for wireless communication in the infrastructure mode, a state in which the first wireless connection once established by the first wireless connecting portion cannot be maintained.

3. The image transmission system according to claim 1, wherein the communication control portion commands the first wireless connecting portion to try to establish the first wireless connection, in a state for wireless communication in the ad hoc mode after the second wireless connection is established, and switches the communication mode from the ad hoc mode to the infrastructure mode if the first wireless connection is established.

4. The image transmission system according to claim 3, wherein the communication control portion includes a transmission/reception termination determining portion configured to determine whether transmission of an image from one of the image processing device and communicating device to the other or reception of the image from the other in the state for wireless communication in the ad hoc mode is terminated, the communication control portion commanding the first wireless connecting portion to try to establish the first wireless connection if the transmission/reception termination determining portion determines that the transmission or reception of the image in the state for wireless communication in the ad hoc mode is terminated.

5. The image transmission system according to claim 3, wherein the communication control portion holds the image transmission system in the state for wireless communication in the ad hoc mode, if the first wireless connecting portion has failed to establish the first wireless connection in the state for wireless connection in the ad hoc mode.

6. The image transmission system according to claim 3, wherein each of the image processing device and communicating device further includes a third communication-setting-information memory portion for storing third communication setting information which is necessary for the first wireless connecting portion to try to establish the first wireless connection in the infrastructure mode, and wherein the communication control portion commands the second wireless connecting portion to try to establish the second wireless connection after commanding the third communication-setting-information memory portion to store the third communication setting information, if the first wireless connection established by the first wireless connecting portion cannot be maintained, the communication control portion subsequently commanding the first wireless connecting portion to try again to establish the first wireless connection on the basis of the third communication setting information read out from the third communication-setting-information memory portion.

7. The image transmission system according to claim 6, wherein the first wireless connecting portion includes a communication-channel specifying portion configured to specify a communication channel through which the image processing device and communicating device communicate with each other through the access point, and wherein the third communication-setting-information memory portion stores the third communication setting information which includes at least information relating to the communication channel specified by the communication-channel specifying portion.

8. The image transmission system according to claim 1, wherein the communication control portion commands the first wireless connecting portion to repeatedly try to establish the first wireless connection until the first wireless connection is established, if the second wireless connecting portion fails to establish the second wireless connection.

9. The image transmission system according to claim 1, wherein each of the image processing device and communicating device further includes a third communication-setting-information memory portion for storing third communication setting information which is necessary for the first wireless connecting portion to try to establish the first wireless connection in the infrastructure mode, and wherein the communication control portion commands the second wireless connecting portion to try to establish the second wireless connection after commanding the third communication-setting-information memory portion to store the third communication setting information, if the first wireless connecting portion fails to establish the first wireless connection, the communication control portion subsequently commanding the first wireless connecting portion to try again to establish the first wireless connection on the basis of the third communication setting information read out from the third communication-setting-information memory portion, if the second wireless connecting portion fails to establish the second wireless connection.

10. The image transmission system according to claim 9, wherein the first wireless connecting portion includes a communication-channel specifying portion configured to specify a communication channel through which the image processing device and communicating device communicate with each other through the access point, and wherein the third communication-setting-information memory portion stores the third communication setting information which includes at least information relating to the communication channel specified by the communication-channel specifying portion.

11. The image transmission system according to claim 1, wherein the second wireless connecting portion establishes the second wireless connection in the ad hoc mode by using a communication channel different from a communication channel used by the first wireless connecting portion to establish the first wireless connection.

12. The image transmission system according to claim 11, wherein the second wireless connecting portion establishes the second wireless connection, by selecting one of two different communication channels which is different from the communication channel used by the first wireless connecting portion.

* * * * *